United States Patent
Zhong (10) Patent No.: US 9,811,720 B2
(45) Date of Patent: *Nov. 7, 2017

(54) MOBILE DEVICE BASED GAIT BIOMETRICS

(71) Applicant: BAE SYSTEMS INFORMATION AND ELECTRONIC SYSTEMS INTEGRATION INC., Nashua, NH (US)

(72) Inventor: Yu Zhong, Winchester, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 642 days.

This patent is subject to a terminal disclaimer.

(21) Appl. No.: 14/445,149

(22) Filed: Jul. 29, 2014

(65) Prior Publication Data

US 2015/0112603 A1    Apr. 23, 2015

Related U.S. Application Data

(60) Provisional application No. 61/894,107, filed on Oct. 22, 2013.

(51) Int. Cl.
*G01P 15/00* (2006.01)
*G06K 9/00* (2006.01)
*G06K 9/46* (2006.01)

(52) U.S. Cl.
CPC ........... *G06K 9/00348* (2013.01); *G06K 9/46* (2013.01)

(58) Field of Classification Search
CPC ............ A61K 2300/00; A61K 31/4704; A61K 45/06; A61K 9/0053; A61K 38/16; A61K 9/2866; A61K 31/44; A61K 31/4409; A61K 38/00; A61K 38/168; A61K 2039/505; A61K 31/137; A61K 31/277; A61K 38/10; H04L 63/123; H04L 63/1416; H04L 63/1425; H04L 63/1441; H04L 63/20; H04L 12/2803; H04L 67/22; H04L 12/282; H04L 12/2816; H04L 12/2818; H04L 12/2823; H04L 12/2829; H04L 12/6418; H04L 2012/28
USPC ..................... 726/23; 342/450, 451; 348/143
See application file for complete search history.

(56) References Cited

U.S. PATENT DOCUMENTS

2012/0072166 A1* 3/2012 Keal ................. G01C 21/165
702/150

OTHER PUBLICATIONS

Han, Xu, Gait Recognition Considering Walking Direction Aug. 20, 2010, Unversity of Rochester, Technical Report No. TR 961.*

(Continued)

*Primary Examiner* — Roy Y Yi
(74) *Attorney, Agent, or Firm* — Sand & Sebolt, LPA (57) ABSTRACT

A system and method for identifying an individual based, at least in part, on their gait is presented. First, acceleration data is received from an accelerometer carried by a person. The acceleration data corresponds to a gait of the person. Rotational invariant values that are independent of a rotational position of the accelerometer are calculated based, at least in part, on the acceleration data. A gait dynamics image (GDI) is calculated based, at least in part, on the rotational invariant values. The GDI is matched to one of a set predetermined GDIs to identify the person.

20 Claims, 5 Drawing Sheets (56) References Cited

OTHER PUBLICATIONS

J. Mantyjarvi, J. Himberg, and T. Seppanen, Recognizing human motion with multiple acceleration sensors, Systems, Man, and Cybernetics, 2001 IEEE International Conference, pp. 747-752, vol. 2, http://ieeexplore.ieee.org/xpl/articleDetails.jsp?tp=&arnumber=973004&queryText%3DRecognizing+human+motion+with+multiple+acceleration+sensors%2C+2001.

J. Frank, S. Mannor, J. Pineau, and D. Precup, Time Series Analysis Using Geometric Template Matching, Pattern Analysis and Machine Intelligence, Mar. 2013, IEEE Transactions, pp. 740-754, vol. 35, Issue 3, http://ieeexplore.ieee.org/xpl/articleDetails.jsp?arnumber=6205761.

* cited by examiner

| $I(1,1)$ | $I(2,2)$ | $I(3,3)$ | $I(4,4)$ | $\cdots$ | $I(n-2,n-2)$ | $I(n-1,n-1)$ | $I(n,n)$ |
| $I(1,2)$ | $I(2,3)$ | $I(3,4)$ | $I(4,5)$ | $\cdots$ | $I(n-2,n-1)$ | $I(n-1,n)$ | $I(n,n+1)$ |
| $I(1,3)$ | $I(2,4)$ | $I(3,5)$ | $I(4,6)$ | $\cdots$ | $I(n-2,n)$ | $I(n-1,n+1)$ | $I(n,n+2)$ |
| $I(1,4)$ | $I(2,5)$ | $I(3,6)$ | $I(4,7)$ | $\cdots$ | $I(n-2,n+1)$ | $I(n-1,n+2)$ | $I(n,n+3)$ |
| $\vdots$ | $\vdots$ | $\vdots$ | $\vdots$ | | | | |
| $I(1,l-2)$ | $I(2,l-1)$ | $I(3,l)$ | $I(4,l+1)$ | $\cdots$ | $I(n-2,n+l-5)$ | $I(n-1,n+l-4)$ | $I(n,n+l-3)$ |
| $I(1,l-1)$ | $I(2,l)$ | $I(3,l+1)$ | $I(4,l+2)$ | $\cdots$ | $I(n-2,n+l-4)$ | $I(n-1,n+l-3)$ | $I(n,n+l-2)$ |
| $I(1,l)$ | $I(2,l+1)$ | $I(3,l+2)$ | $I(4,l+3)$ | $\cdots$ | $I(n-2,n+l-3)$ | $I(n-1,n+l-2)$ | $I(n,n+l-1)$ |

MOBILE DEVICE BASED GAIT BIOMETRICS

CROSS REFERENCE TO RELATED APPLICATION

This application claims priority from U.S. Provisional Application Ser. No. 61/894,107, filed Oct. 22, 2013; the disclosure of which is incorporated herein by reference.

BACKGROUND OF THE INVENTION

1. Field of Invention

The current invention relates generally to apparatus, systems and methods for biometrics. More particularly, the apparatus, systems and methods relate to mobile device based gait biometrics. Specifically, the apparatus, systems and methods provide for a way of using accelerometers to collect gait biometrics to identify a person.

2. Description of Related Art

Gait is the special pattern of human locomotion. It is fairly unique to an individual due to one's specific muscular-skeletal bio-mechanism. Humans can often effortlessly recognize acquaintances by the way they walk or jog. However, as a behavioral biometrics, gait may also be affected by transient factors such as tiredness, sickness, and emotions etc. In addition, external factors such as clothes, shoes, carried loads, and floor characteristics can also influence gait as well.

Automatic gait biometrics, which studies the gait using sensed data, has been an active research area receiving increasing attention over the years. Similar to fingerprints and iris biometrics, gait biometrics can be performed for two purposes: (1) identification, where a gait is compared to a database of enrolled gaits with known identities to determine whom the unknown gait belongs to, and (2) authentication, where a gait is compared to the enrolled gait data of a known person to validate the identity.

Computer vision based gait recognition extracts motion features from image sequences for gait classification. These approaches are, in general, susceptible to variations in viewing geometry, background clutter, varying appearances, uncontrolled lighting conditions, and low image resolutions. Measurements from floor pressure sensors have also been explored for gait recognition. However, these systems are usually too cumbersome to deploy for practical applications.

In the past decade, wearable inertial sensors such as accelerometers have been intensely researched for gait and activity analysis. An accelerometer measures proper acceleration and facilitates motion data collection when worn by a human body. Such sensors are advantageous compared to both videos and floor sensors for automatic gait biometrics.

While in vision based approaches, the inference of body motion from cluttered images is highly ambiguous, error prone, and vulnerable to variations in a number of external factors, accelerometers directly measure human body motion to achieve more accurate gait biometrics. Accelerometers are also inexpensive, small in size (about the size of a coin), and very easy to deploy. Mobile devices such as smart phones and tablets use accelerometers to automatically determine the screen layout for improved user experience. With the ubiquity of such devices, motion measurements of accelerations can be collected continuously and effortlessly for un-obtrusive gait-based authentication and identification, as a mere consequence of a user carrying the mobile device around.

Accelerometer based gait and activity analysis has been a popular research area since the pioneering work done by Mantyjarvi et al. about a decade ago. As is disclosed in J. Mantyjarvi, J. Himberg, and T. Seppanen, Recognizing Human Motion with Multiple Acceleration Sensors, *IEEE Int'l Conf. Systems, Man, and Cybernetics*, 2001 and J. Mantyjarvi, M. Lindholm, E. Vildjiounaite, S.-M. Makela, and H. Ailisto, Identifying Users of Portable Devices From Gait Pattern with Accelerometers, *IEEE Int'l Conf. Acoustics, Speech, and Signal Processing*, vol. 2, pp. 973-976, 2005, the contents of which are incorporated herein. Earlier work used multiple motion sensors attached to human body parts to analyze their movements and bio kinematics. Later, data from a single sensor at a fixed position such as the feet, hips, or waist was also exploited. With the proliferation of smart phones equipped with advanced sensors, there has been a surge of research interest on the use of accelerometers in commercial off the shelf (COT) mobile devices for activity and gait classification. Unlike the dedicated sensors used in earlier research, accelerometer signals in mobile devices are usually irregularly sampled at a relatively low frame rate for power conservation and efficient resource sharing.

The most commonly used triple axis accelerometers capture accelerations along three orthogonal axes of the sensor. Given a multivariate time series of the acceleration data, feature vectors are usually extracted for signal windows corresponding to each detected gait cycle or for windows of a pre-specified size. These windows are compared and matched based on template matching, using either the correlation method or dynamic time warping. Alternatively, statistical features including mean, standard deviations, or time span between peaks in windows, histograms, entropy, higher order moments, and cumulants in spatial domain are also used. Fast fourier transforms (FFT) and wavelet coefficients in frequency domain are used to compare longer sequences. Classifiers including nearest neighbor classifier, support vector machine (SVM), and Kohonen self-organizing map have been used. In some cases, preprocessing such as weighted moving average is applied to suppress the noise in data.

Most existing research is conducted in well controlled laboratory settings: there are strict constraints on where and how the sensors are placed to reduce variation and noise in data. In some cases the sensors are placed in a specific way so that intuitive meanings can be assigned to the data components and exploited for gain analysis.

For practical world applications, it may be unrealistic to assume fixed placement of the sensor. Mobile devices are usually carried casually in pockets or hands casually without constraints in orientation. Since the same external motion results in completely different measurements with changing sensor orientation, it is essential to compute gait biometrics robust to sensor rotation for realistic scenarios. However, research on this aspect is rather scarce. Mantyjarvi et al. used both principle component analysis (PCA) and independent component analysis (ICA) to discover "interesting directions" to compute gait features for activity analysis. The underlying assumption of identical data distributions for both training and testing data are unlikely to hold for realistic applications and computed gait features based on magnitude measurements. However, the computation of the uni-variate magnitude series using the raw 3D multivariate series resulted in information loss and ambiguity artifacts.

One approach to this challenge is augmenting the training set with simulated data at multiple sensor orientations by artificially rotating available training data. However, significant artificial sampling needed to tessellate the 3D rotational space creates unbearable computational and storage burden with the additional risk of degraded classifier performance. Orientation invariant features were extracted using the power spectrum of the time series. However, it suffered shortcomings common to frequency domain methods: loss of temporal locality and precision, and vulnerability to drifting in gait tempo. Others have used a co-built-in gyroscope sensor to calibrate accelerometer data to the up-right posture in order to reduce the influence of noise in sensor orientation. This approach requires calibration prior to every data collection, expects the sensor to not rotate during data collection, only relieves noise in the vertical direction, and makes unrealistic assumptions that all poses are up-right.

These studies paint a picture of drastic degradation in gait recognition performance in the more relaxed scenarios. Even with the new invariant features, accuracy at approximately 50% was reported. On the other hand, performances in the high 90s are often achieved in more controlled scenarios. Although each study uses its own dataset and evaluation standards so the numbers are not directly comparable, the constant large gap in performance does highlight the challenge in realistic gait biometrics using orientation dependent motion sensors.

Although state-of-the-art accelerometer based gait recognition techniques work fairly well under constrained conditions, their performance degrades significantly for real world applications where variations in sensor placement, footwear, outfit, and performed activities persist. For a mobile device based gait biometrics system to succeed, it is crucial to address the variations in sensor orientation due to casual handling of mobile devices.

Despite a surge in research efforts, accelerometer based gait biometrics remains a challenge for practical applications due to data dependency on sensor placement: accelerations are measured along the sensor axis. The measurements change with sensor orientation even when body motion stays the same. Most existing research is conducted in fixed laboratory settings with restricted sensor placement to bypass this problem, and is vulnerable in real world usage where the placement of mobile devices is casual and even arbitrary. Although promising performance is reported in well-controlled studies on gait biometrics using accelerometers, there still is a large gap between existing research and real world applications.

A better way of identifying a person's gait is desired.

SUMMARY

One aspect of an embodiment of the invention includes a method of identifying an individual based on his/her gait. Acceleration data is received from an accelerometer carried by a person, including an accelerometer embedded in a mobile device. The acceleration data corresponds to a gait of the person. Rotational invariant values are calculated based, at least in part, on the acceleration data. The rotational invariant values are independent of a rotational position of the accelerometer on the person and may be calculated as discussed below. A gait dynamics image (GDI) is calculated based, at least in part, on the rotational invariant values. The GDI may be calculated as discussed below. This GDI is matched to one of a set of predetermined GDIs to identify the person. For example, this matching can be performed using correlation methods as discussed below.

In one aspect the embodiment may provide a system for identifying a person based, at least in part, on a gait of the person. The system includes an accelerometer that collects acceleration data. The acceleration data corresponds to a gait of the person. An invariant calculation processor calculates rotational invariant values based, at least in part, on the acceleration data. The invariant values are independent of a rotational position of the accelerometer. A gait dynamics image (GDI) processor generates a GDI based, at least in part, on the rotational invariant values. A matching processor matches the GDI to one of a set of predetermined GDIs to identify the person.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 3A-D are a series of color graphs of actual collected accelerometer data.

Similar numbers refer to similar parts throughout the drawings.

DETAILED DESCRIPTION

This invention addresses the challenge of sensor orientation dependency in acceleration data. Invariant gait representations are computed that are robust to sensor placement while preserving highly discriminative temporal and spatial gait dynamics and context. This advances the state of the art for gait biometrics using accelerometers by the following:

1. Directly computing gait features invariant to sensor rotation for robust matching and classification, unlike many existing works which make unrealistic assumptions of ideal sensor placement.
2. Capturing the gait dynamics and motion interactions within gait cycles to be highly discriminative.

Enabling realistic gait biometrics for a large population through a combination of the above advancements.

Figure 1:
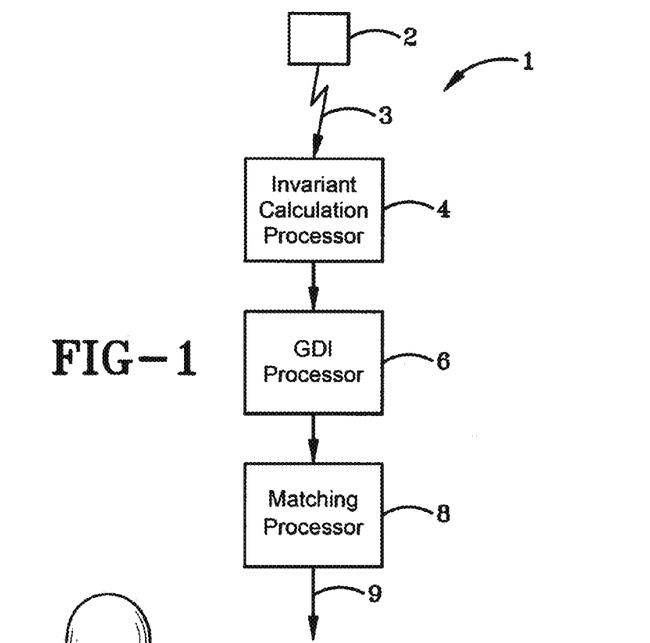
FIG. 1 illustrates a preferred embodiment of a system for determining the identity of a person based, at least in part, on their gait.

FIG. 1 illustrates the preferred embodiment of a system 1 for identifying a person based on their gait. This system includes an accelerometer 2, an invariant calculation processor 4, a gait dynamics image (GDI) processor 6, and a matching processor 8. The invariant calculation processor 4, as discussed below, calculates invariant values associated with a vector captured by the accelerometer 2 that are independent of the rotational orientation of the accelerometer 2. The system may include a wireless link 3 over which the vector is transferred from the accelerometer 2 to the invariant processor 4. As discussed in detail below, the GDI processor 6 generates a gait dynamics image based, at least in part, on the invariant values. As also discussed below, the matching processor 8 matches the gait dynamics images to known gaits of many people. This result may be output on output line 9.

"Processor" and "Logic", as used herein, includes but are not limited to hardware, firmware, software and/or combinations of each to perform a function(s) or an action(s), and/or to cause a function or action from another logic, method, and/or system. For example, based on a desired application or needs, logic and/or processor may include a software controlled microprocessor, discrete logic, an application specific integrated circuit (ASIC), a programmed logic device, a memory device containing instructions, or the like. Logic and/or processor may include one or more gaits, combinations of gaits, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Figure 2:
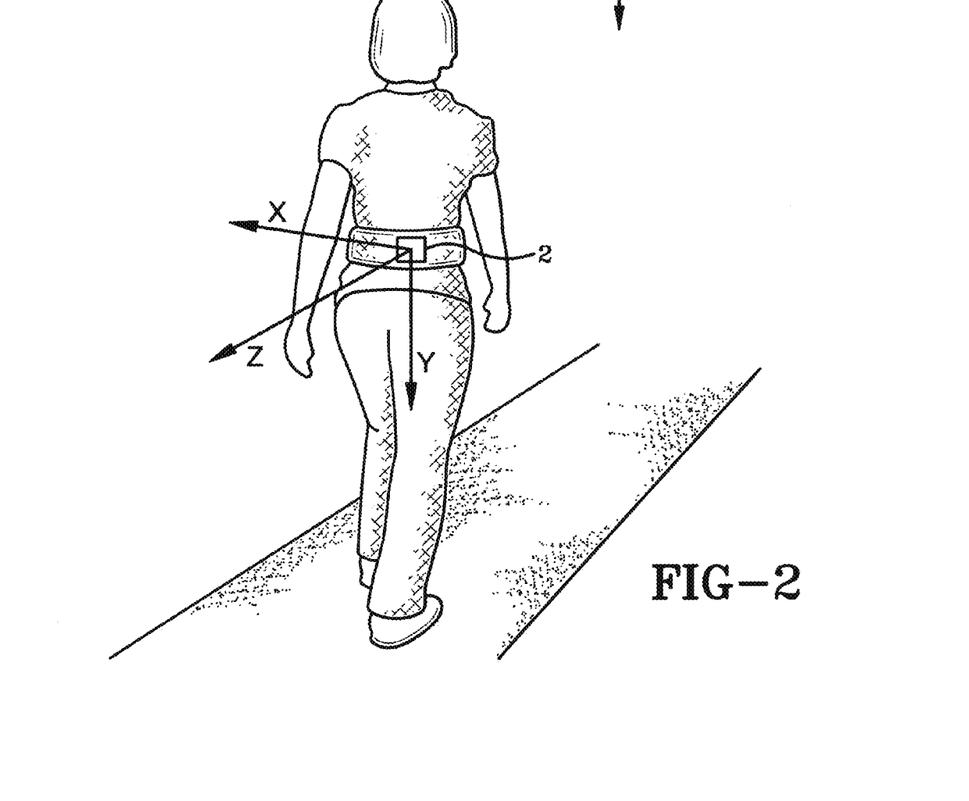
FIG. 2 is an example illustration of an accelerometer being carried by an individual.
Figure 3A:
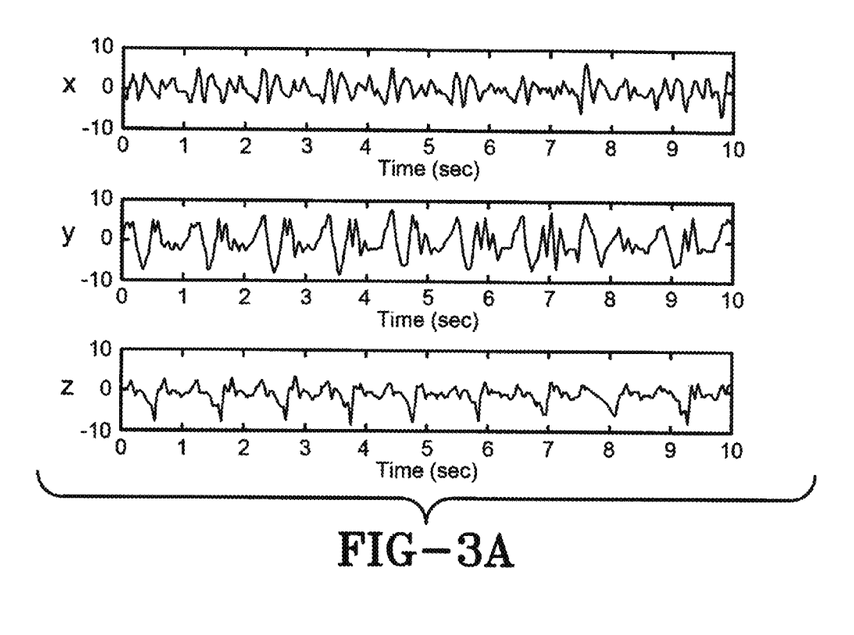
FIG. 3A illustrates example x-, y-, and z-acceleration components from an accelerometer embedded in a mobile phone carried by a walking subject that capture the distinguishing locomotion patterns characteristic of a person's gait.
Figure 3B:
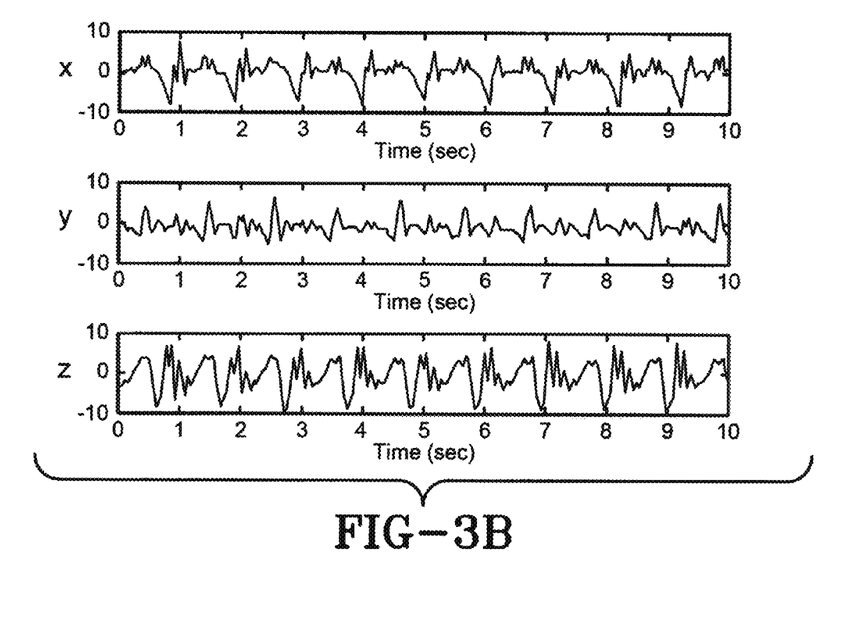
FIG. 3B illustrates example acceleration data for the same subject as FIG. 3A using a rotated phone to provides an alternative "view" of the same gait.
Figure 3C:
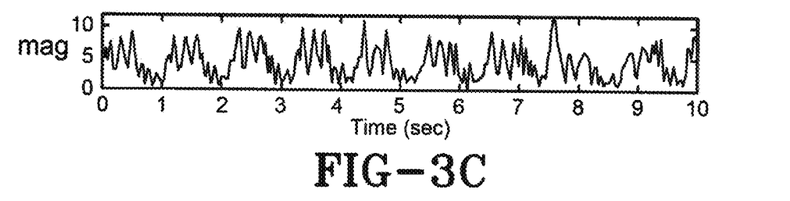
FIG. 3C illustrates the magnitude sequence for the multivariate time series in FIG. 3D.
Figure 3D:
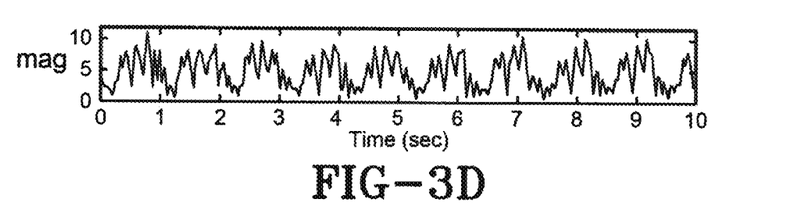
FIG. 3D illustrates the magnitude sequence for the multivariate time series in 3B.

Having introduced the components of the preferred embodiment, its use, operation and benefits will now be described. Accelerometers were originally introduced to mobile devices to automatically adjust the screen display layout. The most commonly used 3-axis accelerometers measure accelerations along three orthogonal axes of the sensor. The gravity vector can be computed using these measurements to determine the device orientation. As it turns out, these acceleration measurements also capture the distinguishing locomotion patterns that are characteristics of a user's gait and can be used for authentication and identification. FIG. 2 illustrates an example sensor that, in the preferred embodiment, is the accelerometer 2 of FIG. 1 attached to back of the waist of a person 10 and additionally illustrates orthogonal x, y and z axis's. The major challenge for mobile device based gait biometrics is the data dependency on sensor orientation. FIGS. 3A and 3B illustrate sensor information collected from two different sensors on the same person but rotated with respect to each other. It is apparent the difference in sensor orientation caused drastically different measurements in the x-, y-, and z-components. FIGS. 3C and 3D illustrate corresponding magnitude time series for FIGS. 3A and 3B, respectively. These magnitude sequences appear to be more consistent than the individual x-, y-, and z-components as sensor orientation changes.

An interesting study was performed comparing the gait ID performances using acceleration magnitudes versus raw acceleration x-, y-, and z-components (see Table 1 below) acquired using mobile phones. It is reported that the magnitude norm feature outperformed features using the x-, y-, z-channel individually or the three channels concatenated when the same classification algorithm was applied. Although it was not explained why the magnitudes appeared more advantageous than the raw acceleration components, it is found that among all the features, only the magnitude feature is robust to variations in sensor orientation, outperforming the others.

For realistic mobile gait biometrics, the placement of the device 2 should be casual and unconstrained. It is essential to extract features that are robust to the sensor rotation. Although magnitude sequences are robust to sensor rotation variations and have been exploited in existing research, valuable gait details crucial to high discrimination may be lost while computing the magnitude series from the 3D raw time series.

The inventors approached this challenge of variations in sensor placement by exploring gait features that characterize the distinguishing locomotion signature while at the same time stay invariant to sensor placement. Although the individual acceleration data depends on sensor placement, it is possible to extract relationships between a pair of the observations from one sensor that do not. The preferred embodiment of the invention subsequently computes features using these pairwise interactions inside each gait cycle to capture the gait dynamics, resulting indiscriminative and robust representations for gait analysis.

1.1 Orientation Invariant Gait Features

Given two 3D acceleration vectors at times $t_1$ and $t_2$, with measurements $\vec{A(t_1)}=[x(t_1)\ y(t_1)\ z(t_1)]^t$ and $\vec{A(t_2)}=[x(t_2)\ y(t_2) z(t_2)]^t$ by an accelerometer with reference frame OXYZ, assume these forces are also captured by a second accelerometer with a reference frame OX'Y'Z': $\vec{A'(t_1)}=[x'(t_1)\ y'(t_1)\ z'(t_1)]^t$ and $\vec{A'(t_2)}=[x'(t_2)\ y'(t_2)\ z'(t_2)]^t$. Let the rotation between the two sensors be R. We have $\vec{A'(t_1)}=R\vec{A(t_1)}$ and $\vec{A'(t_2)}=R\vec{A(t_2)}$. Although the raw acceleration readings depend on the sensor orientation, the inventors were able to extract orientation invariant features using a pair of motion vectors at times $t_1$ and $t_2$:

$$\langle \vec{A'(t_1)}, \vec{A'(t_2)} \rangle = \langle \vec{RA(t_1)}, \vec{RA(t_2)} \rangle \quad \text{Equation 1}$$
$$= \vec{A(t_2)}^T R^T R \vec{A(t_1)}$$
$$= \vec{A(t_2)}^T \vec{A(t_1)}$$
$$= \langle \vec{A(t_1)}, \vec{A(t_2)} \rangle$$

Although the accelerometer raw readings depend on the sensor orientation, the inner product between a pair of the 3D measurement vectors do not. The inner product invariant to sensor rotation is defined as:

$$I_{inner}(\vec{A(t_1)},\vec{A(t_2)}) = \langle \vec{A(t_1)},\vec{A(t_2)} \rangle \quad \text{Equation 2}$$

This invariant quantity is related to the projection of one acceleration vector on the other, which stays the same regardless of the choice of the reference frame. In the special case when $t_1=t_2$, $<\vec{A(t_1)}, \vec{A(t_2)}>=<\vec{A'(t_1)}, \vec{A'(t_1)}>$, and $\|x(t)^2+y(t)^2+z(t)^2\|^{1/2}=\|x'(t)^2+y'(t)^2+z(t)^2\|^{1/2}$. That is, the magnitude of the 3D acceleration vector is invariant to sensor placement. From these invariants, we can also derive additional invariant features with normalizing effects. Among them is the cosine similarity measure:

$$I_{cos}(\vec{A(t_1)}, \vec{A(t_2)}) = \frac{<\vec{A(t_1)}, \vec{A(t_2)}>}{\|\vec{A(t_1)}\|\|\vec{A(t_2)}\|}$$

Equation 3

Intuitively, this invariant is the cosine of the angle between two 3D acceleration vectors. It remains the same for all reference frames that are static with respect to each other. Equation 2 and Equation 3 are also invariant to symmetry transforms of the signals.

1.2 Gait Dynamics Images

We exploit these invariant motion interactions to extract features that characterize the locomotion dynamics and which are robust to variations in sensor placement. Given a 3D acceleration time series of size n sampled at regular time intervals $\{\vec{A(1)}, \vec{A(2)}, \vec{A(3)}, \ldots, \vec{A(n-1)}, \vec{A(n)}\}$, we define a two dimensional matrix which we call Gait Dynamics Image (GDI) to capture invariant motion dynamics over time and interactions within each gait cycle. GDI also extends to all linear transforms of the raw acceleration data, including integration over time for velocity and double integration over time to get displacement. That is, for Equation 2 and Equation 3 (described above), we can replace A(t) with any linear transform T(A(t)) of A(t). Further, as Equation 2 and Equation 3 are also invariant to symmetry transforms of the signals, this allows GDIs obtained from a phone placed in one side pocket match to GDIs obtained from a phone placed in an opposite pocket.

Let the invariant feature computed using data vectors $\vec{A(t_1)}, \vec{A(t_2)}$ be $I(t_1, t_2)$, using either Equation 2 or Equation 3 (defined above). The Gait Dynamics Image (GDI) is defined as follows:

GDI(i,j)=I(j,i+j−1),      Equation 4 where: i=1, . . . , l and j=1, . . . n−l+1
where l is the range of the time delay for concerning pairwise motion interactions, for which we choose to encode context within a typical gait cycle. In some configurations, the dynamics image (GDI) also extends to all linear transforms of the raw acceleration data, including integration over time for velocity and double integration over time to determine a displacement. For example, in Equations 2 and 3, A(t) can be replaced with any linear transform T(A(t)) of A(t). Additionally, Equations 2 and 3 are also invariant to symmetry transforms of signals which allows the GDIs obtained from a phone placed in one side pocket match to GDIs obtained from a phone placed in the pocket on the opposite side pocket of the same person.

Figure 4:
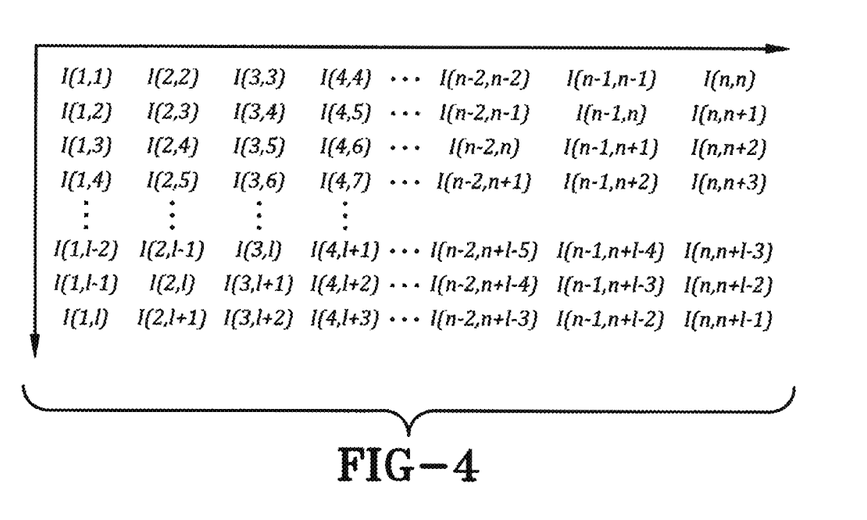
FIG. 4 illustrates a gait dynamics image (GDI) which is defined to characterize the flow dynamics over time and interactions within each gait cycle that is robust to the placement of the accelerometers.

Gait dynamics images encode rich dynamics and context information characterizing the unique gait of an individual. As shown in the tth row (see FIG. 4) of the GDI contains all pairwise interactions of time delay i−1 over time, while the jth column consists of interactions between the motion at time j and all its successors up to time lag l−1 to capture local context. In particular, the first row of the inner product gait dynamics image, which are the inner products of observation pairs with time lag 0, corresponds to the magnitude sequence that has been shown to be advantageous to the raw component acceleration features in cell phone based gait ID studies, and which has been popularly used in existing research to handle the variations in sensor placement. The remaining rows contain the interactions at varying time lags that contribute to additional discriminating information of the gait dynamics. This makes GDIs extremely powerful representations for gait biometrics.

The cosine similarity GDIs can be considered a normalized form of the inner product GDIs by taking out the effects of the magnitudes. These GDIs only depend on the angles between the observation vectors. This normalization may improve the robustness to noisy magnitudes in the data. In summary, the GDI, although built on the sensor rotation dependent raw acceleration measurements, achieves a view invariant representation of the governing dynamics in the original multivariate time series for robust gait analysis. Furthermore, it preserves the local interactions and contextual information within each gait cycle essential for discriminative motion analysis to enable highly accurate gait biometrics.

Figure 5:
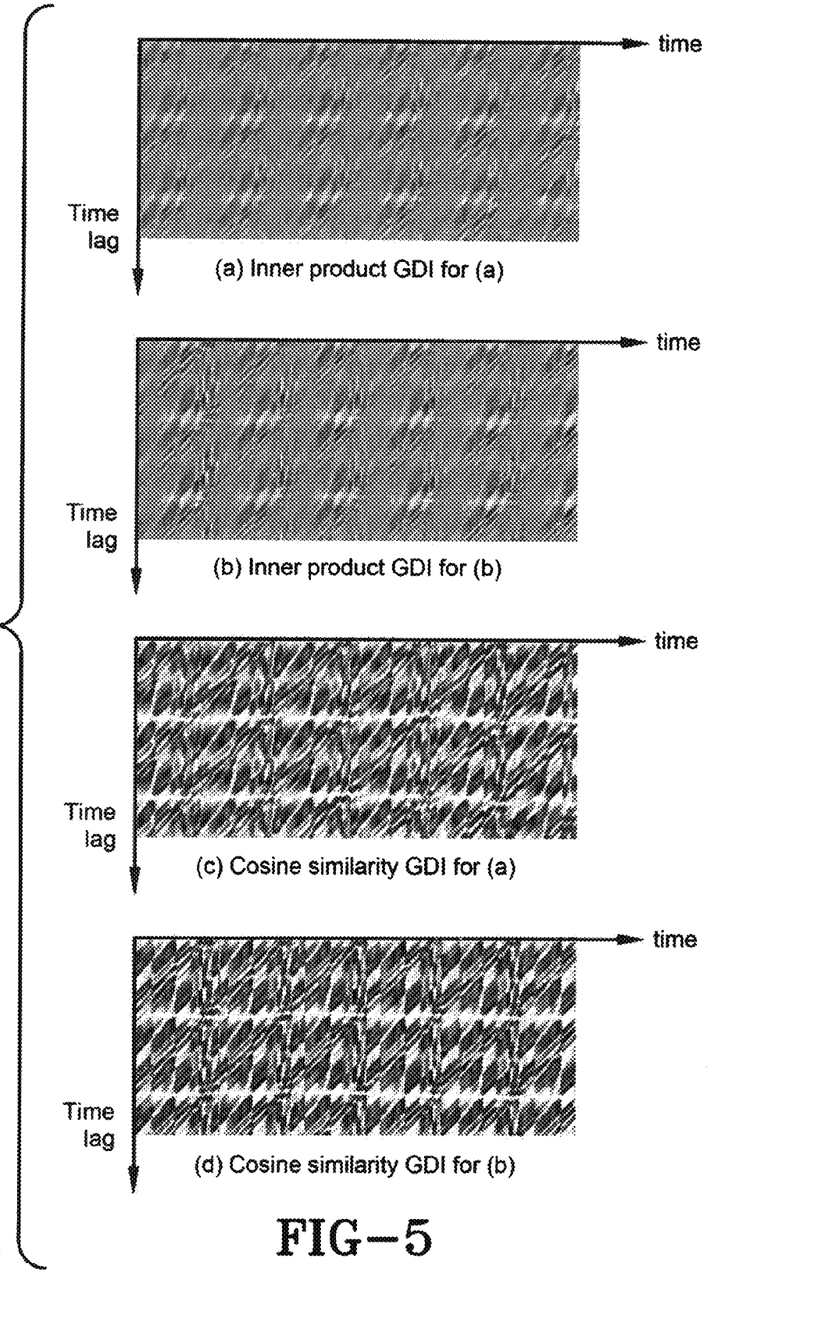
FIG. 5 contains color images of gait dynamics images for inner product GDI and cosine similarity GDI in (a) and (c) for the data in FIGS. 3A and 3C, respectively; and color images of gait dynamics images for; inner product GDI and cosine similarity GDI in (b) and (d) for the data in FIGS. 3B and 3D, respectively.

FIG. 5 illustrates the gait dynamics images for the acceleration sequences in FIGS. 3A-D. The GDIs exhibit much better consistencies between the two collections than the raw time series of FIGS. 3A-B. GDIs encode both dynamics for the time series and the local interactions. With the irregularly periodic input locomotion time series, gait dynamics images also display quasi-periodicity in both the time and time lag domains with the period approximating the length of a gait cycle.

As shown in the gait dynamic images of FIG. 5, when the time lag coincides with the length of the local gait cycle, the inner product (Equation 2) or normalized correlation (Equation 3) are high as the signals repeat themselves. This is reflected by horizontal lines of high similarity measurements in both GDIs, starting with the first row, repeating at the length of a gait cycle. A bright value at a pixel indicates a high degree of similarity in terms of inner product for the inner product GDIs and normalized correlation for cosine similarity GDIs. Gait cycles can be estimated by fitting smooth horizontal curves across the image which maximizes the overall intensities. Due to the quasi-periodic nature of gait and the repetitive pattern in GDIs, we set l to be a little more than the length of average gait cycles (for example, equal to about 2.5) to preserve all contexts within a gait cycle when computing GDIs.

1.3 Gait Identification Using GDIs

The inventors used a local patch correlation based similarity measure to match two GDIs. One of the GDIs is divided into adjacent but non-overlapping windows of about two gait cycles (2.4 sec). Each of the windows is correlated with the second gait dynamics image. In the correlation coefficient array, the dominant peak in every window of size of a gait cycle (1.2 sec) is extracted. These coefficients are then sorted and the pth percentile point of the coefficient is used as the score between the window from the first GDI and the second GDI. A score is computed for every window in the first GDI. The qth percentile point of these scores is used as the similarity between the two GDIs.

The nearest neighbor classifier is then used to assign the label or identification of the nearest training GDI to the test GDI. The choice of order statistics for similarity measurement helps against the noise in data.

2. Experiments

The inventors conducted some initial performance analysis on gait analysis using the GDIs. The goal is to investigate the effectiveness of GDIs for robust gait biometrics. The large real-world dataset for gait recognition from McGill University was used due to its analogy to realistic gait biometrics using mobile devices. HTC Nexus One phones were used to collect triple axis acceleration data from 20 individuals, each performing two separate 15 minute walks on two different days at an average frame rate of 28 Hz. There was little constraint on the placement of the phone except that it was put in a pocket on the same side for a subject during the two collections. The user could place the phone in any arbitrary orientation facing either inwards or outwards. The subjects were allowed to change clothes and shoes. When a subject changed from a dress to pants, or jeans to baggy shorts, the position and the degree of freedom for the phone to move changed as well, affecting the motion characteristics. The subjects chose whether or not to carry backpacks for each data collection. For these reasons, it is the most realistic and challenging dataset publicly available for practical gait recognition using mobile devices.

GDIs were extracted corresponding to 50 seconds of raw signals with a time lapse of up to 1.2 seconds. A simple correlation based classification method was used to assess the effectiveness of the GDI representations. The similarity between a pair of GDIs was computed by aggregating peak correlation coefficients between sub-GDIs that correspond to a window of two gait cycles (2.4 sec). A testing GDI is then assigned the label of the nearest training GDI. The recognition accuracy using the GDIs was compared to a baseline which used the same classifier, but only on the magnitude series (which is the first row of the inner product GDI). This baseline feature was used because it has been popularly used in existing studies and shown to perform better than the others. It has good invariance and has been used in studies with relaxed settings. Two scenarios are examined: the first set of evaluations uses data from the same day for both training and testing, with no overlap; the second set of tests uses training data from one day and test data from the other day. Obviously the second scenario is more challenging as the attires, carried loads, shoes, and most importantly the phone placements are all subjected to change in addition to the variations in the same-day scenario.

Table 1 shows the accuracies for the gait recognition algorithms. Although both the magnitude series and GDIs are robust to orientation variations, GDIs contain much more information on context and interactions in gait cycles to offer powerful discrimination and perform significantly better than magnitude features. This advantage is even more drastic for the challenging between day scenario with more variations, where we obtain an accuracy of 66.3%, more than doubling the accuracy using magnitude features. Though all methods performed worse for the between day scenario, the methods using GDIs degraded much more gracefully thanks to their rich discriminating gait dynamics.

For comparison, the inventors found one published work using this dataset at J. Frank, S. Mannor, J. Pineau, and D. Precup, Time Series Analysis Using Geometric Template Matching, *IEEE Trans. Pattern Analysis and Machine Intelligence,* 35(3): 740-750, March 2013, the contents of which are incorporated herein by reference, where a 49% accuracy is reported on classification of two sec windows for the between day scenario and 62% accuracy on windows with a full span of activities (no pause within). Advanced boosting and bagging techniques were applied on magnitude series in these studies. The inventors study indicates that GDIs offer powerful representation encoding gait dynamics and interactions that are robust to sensor placement variations. Later, the inventors expect to combine GDI with advanced machine learning methods such as random forest and boosting to further improve the performance.

TABLE 1

Preliminary accuracy on gait recognition using Gait Dynamics Images.

| Gait ID Accuracy | Train/test on the same day | Train on one day, test on another day |
| --- | --- | --- |
| Magnitude (baseline) | 67.5% | 32.5% |
| Inner Product GDI | 87.5% | 61.3% |
| Cosine Similarity GDI | 85.0% | 66.3% |

Those of ordinary skill in the art will appreciate that the preferred embodiment is a novel invariant gait representation called gait dynamics images (GDIs) that is robust to variations in sensor orientation, and captures the complex dynamics and context within each gait cycle. These relaxed requirements in sensor placement and the high discriminating power combine to enable a robust and accurate computational gait biometrics for casual mobile device users in their day-to-day lives. In addition, gait dynamics images embrace the popular rotation invariant magnitude feature as a subset, and further encode fine scale intrinsic interactions and context within gait cycles to be informative and discriminative. As a result, it is capable of handling a large user population.

The inventors conducted a gait identification performance study using GDIs on a realistic data set. A correlation based approach is used to match two GDIs. GDIs have shown dominant superiority over magnitude features which has been popularly exploited in state-of-the-art for robust gait analysis.

Additionally, those of ordinary skill in the art will appreciate that the present invention is also applicable to motion analysis for activity recognition and analysis which would indicate the type of activity in which a person is participating by analyzing collected motion data. Such motion analysis would be useful for health monitoring, disease diagnosis, and the like.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
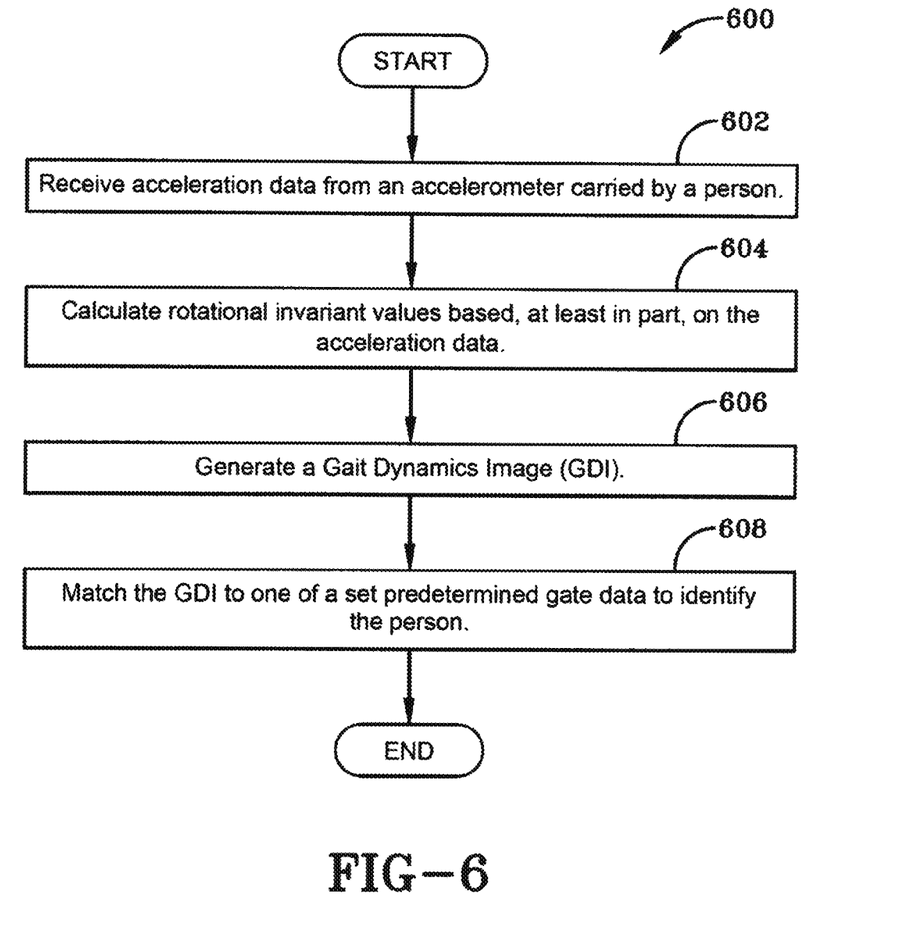
FIG. 6 illustrates an embodiment of a method for identifying an individual based, at least in part, on their gait.

FIG. 6 illustrates a method 600 of identifying an individual based on their gait. Acceleration data is received, at 602, from an accelerometer carried by the person. The acceleration data corresponds to a gait of the person. Rotational invariant values are calculated based, at least in part, on the acceleration data, at 604. The rotational invariant values are independent of a rotational position of the accelerometer on the person and may be calculated as discussed above. A GDI is calculated based, at least in part, on the rotational invariant values. The GDI may be calculated as discussed above. This GDI is matched, at 608, to one of a set of predetermined GDIs to identify the person. For example, this matching can be performed using correlation methods as discussed above.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

It is to be appreciated and understood that the appended claims apply not only to the raw acceleration sequence A(t), but also to other sequences including, by way of non-limiting example, velocity or displacement sequences, which can be obtained by applying linear operators to the raw acceleration sequence A(t).

What is claimed is:

1. A method of identifying a person by the person's gait comprising:
   providing an accelerometer, an invariant calculation processor, a gait dynamics processor, and a matching processor;
   programming the matching processor with a set of predetermined gait dynamics images (GDIs);
   positioning the accelerometer on the person;
   linking the accelerometer to the invariant calculation processor;
   linking the invariant calculation processor to the gait dynamics image processor;
   linking the gait dynamics image processor to the matching processor;
   moving from one point to another point while carrying the accelerometer;
   generating, with the accelerometer, acceleration data corresponding to a gait of the person;
   transferring the acceleration data from the accelerometer to the invariant calculation processor;
   calculating, with the invariant calculation processor, rotational invariant values based, at least in part, on the acceleration data, wherein the rotational invariant values are independent of a rotational position of the accelerometer on the person;
   generating, with the gait dynamics image processor, a gait dynamics image (GDI) of the person based, at least in part, on the calculated rotational invariant values;
   comparing, with the matching processor, the person's GDI to the set of predetermined GDIs; and
   Identifying the person when the person's GDI matches one of the set of predetermined GDIs.

2. The method of claim 1 wherein the calculating of the rotational invariant values further comprises:
   calculating inner product values.

3. The method of claim 2 wherein the calculating inner product values further comprises:
   calculating the inner product values according to:

$$I_{inner}(\overrightarrow{A(t_1)}, \overrightarrow{A(t_2)}) = <\overrightarrow{A(t_1)}, \overrightarrow{A(t_2)}>$$

where $\overrightarrow{A(t_1)} = [x(t_1)\ y(t_1)\ z(t_1)]^t$ and $\overrightarrow{A(t_2)} = [x(t_2)\ y(t_2)\ z(t_2)]^t$ are two 3D acceleration vectors at times $t_1$ and $t_2$.

4. The method of claim 1 wherein the calculating of the rotational invariant values further comprises:
   calculating rotational invariant values that correspond to cosine similarity measure values.

5. The method of claim 4 wherein the calculating cosine similarity measure values further comprises:
   calculating cosine similarity measure values according to:

$$I_{cos}(\overrightarrow{A(t_1)}, \overrightarrow{A(t_2)}) = \frac{<\overrightarrow{A(t_1)}, \overrightarrow{A(t_2)}>}{\|\overrightarrow{A(t_1)}\|\|\overrightarrow{A(t_2)}\|}$$

where $\overrightarrow{A(t_1)} = [x(t_1)\ y(t_1)\ z(t_1)]^t$ and $\overrightarrow{A(t_2)} = [x(t_2)\ y(t_2)\ z(t_2)]^t$ are two 3D acceleration vectors at times $t_1$ and $t_2$.

6. The method of claim 5 wherein the generating the GDI further comprises generating the GDI according to:

$$GDI = I_{cos}(j, i+j-1);$$

where: $i=1, \ldots, l$ and $j=1, \ldots, n-l+1$ and where l is the range of the time delay.

7. The method of claim 1 wherein the transferring further comprises:
   wirelessly transferring the acceleration data.

8. The method of claim 1 wherein the transferring further comprises:
   transferring three-dimensional (3D) acceleration data values.

9. The method of claim 1 wherein the transferring acceleration data further comprising:
   transferring acceleration data at a data rate of from about 25 hertz (Hz) up to about 100 Hz.

10. The method of claim 1 wherein the accelerometer is provided in a mobile device and the transferring of the acceleration data from an accelerometer further comprises:
    transferring the acceleration data from the mobile device.

11. The method of claim 1 wherein the acceleration data is first acceleration data, the rotational invariant values are first rotational invariant values and the method further comprises:
    transferring second acceleration data associated to the gait of the person to the invariant calculation processor;
    calculating, with the invariant calculation processor, a second rotational invariant values based, at least in part, on the second acceleration data;
    generating, with the gait dynamics image processor, the person's GDI based, at least in part, on the first rotational invariant values and the second rotational invariant values.

12. The method of claim 11 wherein the accelerometer is a first accelerometer and further comprising:
    providing a second accelerometer carried by the person;
    positioning the second accelerometer on the person; and
    transferring the second acceleration data from the second accelerometer to the invariant calculation processor.

13. The method of claim 1 wherein the person's GDI is a first GDI and further comprising:
    calculating, with the matching processor, a first correlation value associated with the first GDI and;
    calculating, with the matching processor, a second correlation value associated with a known GDI in the set of predetermined GDIs;
    comparing, with the matching processor, the first correlation value with the second correlation value; and
    wherein the identifying of the person is based, at least in part, with the compared first and second correlation values.

14. A system for identifying a person based, at least in part, on a gait of the person comprising:
    an accelerometer, adapted to be positioned on the person, and configured to periodically collect acceleration data as the person moves, wherein the acceleration data corresponds to the gait of the person;
    an invariant calculation processor wirelessly linked to the accelerometer and programmed to calculate rotational invariant values based, at least in part, on the acceleration data, wherein the invariant values are independent of a rotational position of the accelerometer on the person;
    a gait dynamics image (GDI) processor linked to the invariant calculation processor and programmed to generate a gait dynamics image (GDI) for the person based, at least in part, on the calculated rotational invariant values; and
    a matching processor linked to the gait image dynamics processor and programmed to compare the generated GDI for the person to one of a set of predetermined GDIs programmed into the matching processor; and wherein the matching processor is further programmed to identify the person based on the comparison of the person's GDI to the set of predetermined GDIs.

15. The system of claim 14 further comprising:
    a mobile device, wherein the accelerometer is located in the mobile device.

16. The system of claim 14 wherein the invariant calculation processor further comprises:
    inner product logic configured to calculate rotational invariant values that are inner product values.

17. The system of claim 16 wherein the inner product logic is configured to calculate the inner product values according to:

$$I_{inner}(\vec{A(t_1)}, \vec{A(t_2)}) = <\vec{A(t_1)}, \vec{A(t_2)}>$$

where $\vec{A(t_1)} = [x(t_1)\ y(t_1)\ z(t_1)]^t$ and $\vec{A(t_2)} = [x(t_2)\ y(t_2)\ z(t_2)]^t$ are two 3D acceleration vectors at times $t_1$ and $t_2$.

18. The system of claim 14 wherein the invariant calculation processor further comprises:
    trigonometric product logic configured to generate rotational invariant values that are trigonometric values.

19. The system of claim 18 wherein trigonometric product logic is configured to generate rotational invariant values according to:

$$I_{cos}(\vec{A(t_1)}, \vec{A(t_2)}) = \frac{<\vec{A(t_1)}, \vec{A(t_2)}>}{\|\vec{A(t_1)}\| \|\vec{A(t_2)}\|}$$

where $\vec{A(t_1)} = [x(t_1)\ y(t_1)\ z(t_1)]^t$ and $\vec{A(t_2)} = [x(t_2)\ y(t_2)\ z(t_2)]^t$ are two 3D acceleration vectors at times $t_1$ and $t_2$.

20. The system of claim 14 wherein the GDI processor generates the person's GDI according to:

$$GDI = I_{cos}(j, i+j-1);$$

where: $i=1, \ldots, l$ and $j=1, \ldots, n-l+1$ and where $l$ is the range of the time delay.

* * * * *